United States Patent Office 3,843,457
Patented Oct. 22, 1974

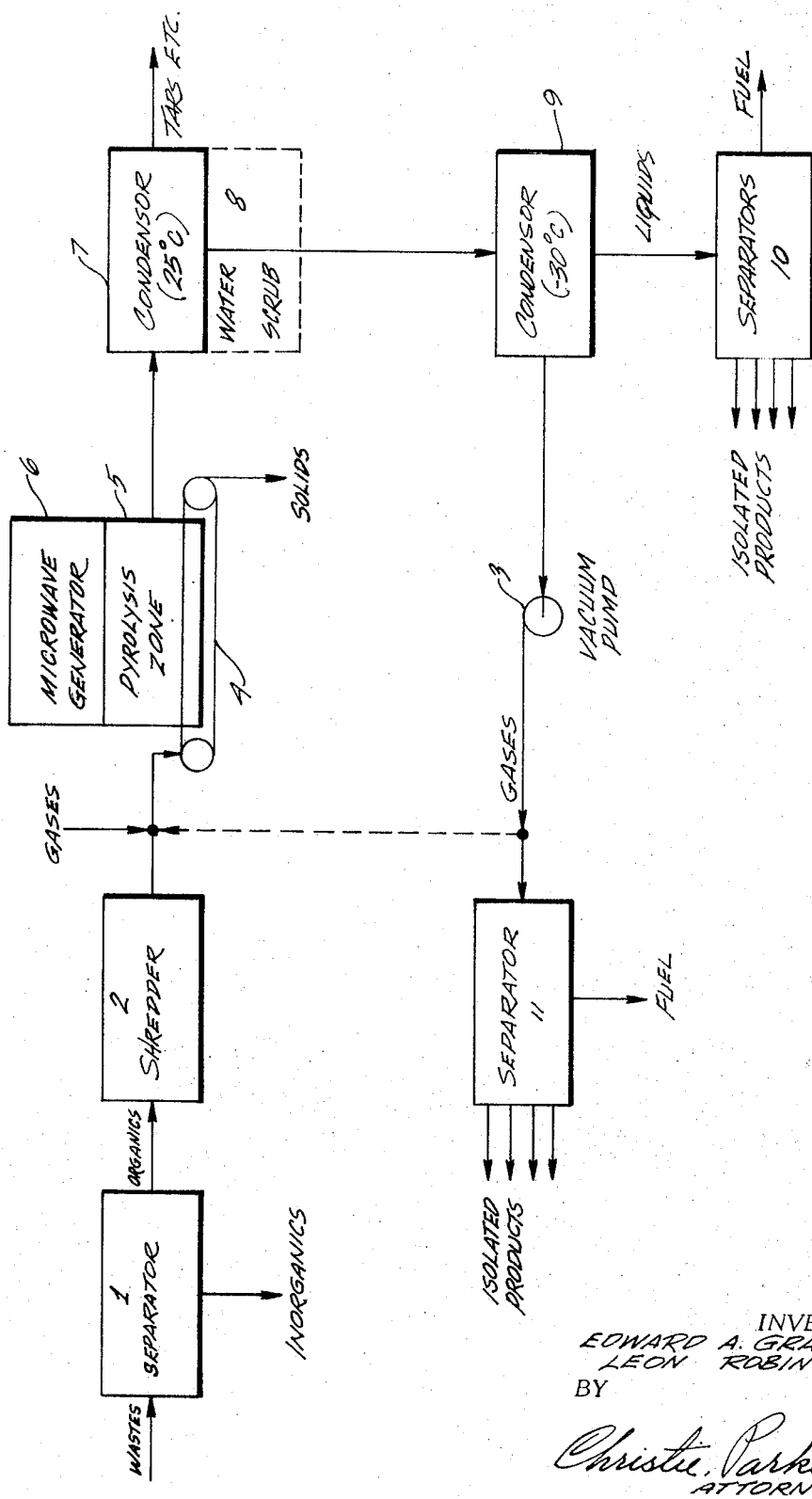

3,843,457
MICROWAVE PYROLYSIS OF WASTES
Edward A. Grannen, Upland, and Leon Robinson, Diamond Bar, Calif., assignors to Occidental Petroleum Corp., Los Angeles, Calif.
Filed Oct. 14, 1971, Ser. No. 189,228
Int. Cl. C10b 49/00
U.S. Cl. 201—2.5                                                9 Claims

ABSTRACT OF THE DISCLOSURE

Recovery of valuable organic compounds from organic industrial and household wastes is effected by rapid and relatively low temperature pyrolysis of the organic material in a microwave discharge. The organic wastes are separated from inorganic materials and shredded to a fine particle size. This material is mixed with a gas stream at a low pressure, typically about 10 millimeters of mercury, and the wastes are then conveyed through a pyrolysis zone where they are subjected to microwave discharge in the low gigahertz frequency range. Molecular decomposition occurs principally at carbon-oxygen and other polar bonds and the many reactive fragments may react with the gas stream which preferably has reactive species of gas such as hydrogen or hydrocarbons. Vaporized products are rapidly swept from the pyrolysis zone by the gas stream and passed to separation stages where various organic products are isolated and residual fluids may be employed as fuels. A portion of the gases may be recycled to the pyrolysis zone.

BACKGROUND

A major problem in our modern affluent society is the production and disposal of solid waste materials which are commonly discarded and usually buried in cut and cover dumps. This not only involves substantial problems in the effective disposal of waste but also amounts to an enormous expenditure of natural resources which are in no way reclaimed. There is a large value in the great variety of organic products presently disposed of, however, with prior techniques it is usually uneconomical to salvage more than a limited portion of the most valuable of these products.

The efforts towards recovery of valuable products from industrial and household wastes has involved mechanical or manual sorting to separate materials such as metal, paper or the like which can be recycled in its existing form. Other techniques have ground the product for the purpose of making building materials. Still another approach has been to biodegrade the waste materials to produce an organic mulch for agricultural use. To date none of these have proved universally satisfactory, to a large extent because the enormous variety of products that may occur in wastes which vary enormously in size, composition, weight, density and value. The mixed refuse at a collection or transfer station may include newspapers, metal in a variety of forms, cardboard boxes, bottles, garbage, tires, garden trimmings, clothing, dirt, masonry, wood, etc. Automatic equipment for handling such a melange of materials is difficult to implement.

It is, therefore, highly desirable to provide a technique for processing solid industrial and household wastes in order to recover valuable products and reduce the volume of materials that must otherwise be disposed of.

BRIEF SUMMARY OF THE INVENTION

There is, therefore, provided in practice of this invention according to a presently preferred embodiment a technique for recovering vaporizable organic compounds from nominally solid organic wastes by comminuting the wastes and mixing them with a gas stream at a pressure substantially less than atmospheric. The comminuted wastes are subjected to microwave discharge which effects molecular decomposition and the vaporized compounds are thereafter recovered from the gas stream.

DRAWINGS

These and other features and advantages of the present invention will be better understood by reference to the following detailed description of a presently preferred embodiment when considered in connection with the accompanying drawing which comprises a block diagram of a system for microwave pyrolysis of organic wastes and recovery of vaporizable products therefrom.

DESCRIPTION

The drawing of this application illustrates in block diagram form a pyrolysis system for waste materials constructed according to principles of this invention. As illustrated in this presently preferred embodiment mixed wastes which are nominally solid at ambient temperature are passed to a separator 1 which may include several operations by which organic materials are separated from inorganic materials. The separator may include, for example, manual or automatic equipment for isolating various components. Thus, for example, aluminum articles or cardboard boxes may be manually separated for separate recovery, if economical. Automatic gravity separation may be used for separating most metal and masonry objects from the organic material. A variety of other conventional separation techniques will be apparent to one skilled in the art. Partial comminution may be included in order to enhance the separations.

It is apparent that the cost of separating increases as one strives to be more and more complete in effecting separation. There will, therefore, invariably be a certain proportion of organic materials discharged from the separator 1 with the inorganic materials. Likewise a proportion of inorganic materials will accompany the separated organics. Typically, it appears that about 2% of inorganic material accompanies the organic although this figure may vary substantially from moment to moment depending on the mix of waste entering the system. The wastes are also considered to be nominally solid materials at ambient temperatures. However, it will be recognized that a certain amount of liquids may accompany the solid materials, absorbed or adsorbed therein. Household garbage may include substantial amounts of liquids, or oil soaked rags or the like may also be present.

The organic materials separated from the inorganics are then passed to a shredder 2 or similar comminuting device that reduces the particle size of the organic materials to a high degree. The comminution of the organic wastes is largely to increase the surface area thereof and provide free paths for gas evolution in the subsequent pyrolysis.

After shredding or even before, gases hereinafter, described in greater detail are added to the organic waste. A vacuum pump 3 is provided at a downstream point in the system so that a continual flow of gas at low pressure is present through the system. The pressure in the gas is preferably maintained at or below about atmospheric, although at some points in the system it may be above that range during the course of processing. The pressure in the pyrolysis region is preferably in the range of from about 0.1 millimeters of mercury up to 100 millimeters in order to obtain optimum ionization of the gases. Higher pressures may require a higher power level to obtain the desired reactivity. The solid wastes and associated gases are conveyed by conventional means such as a screw or belt conveyor (not shown) to a belt conveyor 4 preferably having a woven glass belt for flexibility, resistance to somewhat elevated temperatures and stability in radio frequency discharges. It should be noted that despite the fine shredding of the organic waste materials there is only a small amount of the solids carried in the moving gas stream despite its high velocity because of the low density thereof. Some of the very finest solid material is carried through the system in the gas stream but the great bulk of the solid material is conveyed on the glass belt conveyor 4.

The glass belt conveyor proceeds through a pyrolysis zone 5 which may take any convenient shape compatible with the exit horn of a microwave generator 6. The microwave generator comprises a conventional radio frequency generator that produces electromagnetic radiation in the low gigahertz frequency range, namely from about 0.8 to 100 gigahertz. Many such commercial microwave generators employing radio frequency power tubes such as magnetrons, klystrons and ampiitrons are available and can be used substantially interchangeably. Frequencies in this range are preferred since microwave equipment is readily available. Further the chemical bond resonances are responsive to radiation in this range. In a typical embodiment the microwave generator may have its principal power output at about 2.4 gigahertz, since this is a convenient commercially available device. Relatively low power levels are required and depend almost entirely on the quantity of solid material being treated in the pyrolysis zone and to some extent on the gas pressure.

The length of the pyrolysis zone and speed of operation of the glass belt conveyor 4 are adjusted so that the average residence time of the solid organic wastes in the pyrolysis zone is in the order of about one second. If the solids remain longer times at optimum power levels, charring occurs and here may be excessive sticking to the walls of the pyrolysis zone and to the belt. Within this zone the microwave generator creates a substantial discharge involving considerable ionization of the low pressure gas. Considerable molecular agitation is also introduced in the organic wastes by the microwave energy and this energy is particularly concentrated in the polar bonds of the organic molecules such as the carbon-oxygen, carbon-sulfur and carbon-nitrogen bonds, thereby, selectively rupturing such bonds as compared with the carbon-carbon bonds in the organic molecules. A substantial amount of cracking of the carbon-carbon bonds also occurs, however, because of the very large number of such bonds in the organic wastes.

It should be noted that the principal portion of the organic wastes entering the pyrolysis zone are carbohydrates including many carbon-oxygen bonds. The microwave discharge disrupts many of these bonds and creates highly reactive fragments of the organic materials. Many of the fragments produced are vaporizable and leave the solid organic wastes and mix with the flowing low pressure gas stream. Because of the inherent reactivity of the molecular fragments and the reactivity of the ionized gases in the pyrolysis zone considerable recombination occurs.

It is desirable to select the composition of the gas stream for producing desired end products and therefore the gas stream includes gases selected from the group consisting of oxygen, nitrogen, hydrogen, water, carbon dioxide, carbon monoxide, methane, and recycled gases from the pyrolysis zone which generally includes a complex mixture of hydrocarbons. Generally it is preferred to employ reducing gases, particularly hydrogen, in the gas stream because of the relatively high oxygen content of the decomposed carbohydrates. The gas flow rate is preferably kept high so that the vaporized products are rapidly swept out of the pyrolysis zone so that no further decomposition occurs. This assures the presence of relatively large amounts of more complex organic molecules than would be obtained by prolonged exposure to microwave discharge. Hydrogen is a particularly good gas to have in the pyrolysis zone since hydrocarbons such as methane, ethane, ethylene, acetylene and the like are produced as a result of hydrogen reacting with carbon monoxide and carbon dioxide formed from the waste.

In the microwave discharge zone where pyrolysis is occurring the temperature is typically less than about 200° C. and if required to maintain such a temperature and assure volatilization of some of the heavier organic materials a sufficient quantity of oxidizing gas can be introduced to give a net exothermic effect. Conversely if the temperature becomes excessive some destruction of valuable organic molecules may occur and auxiliary cooling of the pyrolysis zone can be employed. The temperature of the molecules in the wastes may be considered to be higher than this because of the high bond agitation but this energy may appear as dissociation rather than as a general heating of the surroundings.

The solid products from the pyrolysis zone are removed from the glass belt conveyor 4 and may be disposed of in a variety of ways. Typically these solid materials have an average composition of about 76% carbon, 11% hydrogen, 2% or 3% ash, about 1% of nitrogen sulfur, etc. and a balance of oxygen. The solid materials can therefore be used as fuel, however they tend to be somewhat fluffy and hence difficult to handle. The solids can, of course, be buried or otherwise disposed of in conventional dumping operations but since high in organic content and finely divided they are particularly suited for biodegradation to produce organic mulch or the like. If desired, the residual solid materials can be subjected to a second pyrolysis step for producing additional valuable organic compounds.

The vaporized components from the pyrolysis zone are passed to a first condenser 7 which typically operates at about room temperature. The heaviest fractions of the organic molecules produced in the pyrolysis zone are condensed and separated in this stage. The heavy tars and oils, phenols, most acids and heavier alcohols are principally separated at this point. If desired a water scrub 8 may be operated in combination with the condenser 7 for removing HCl and the like which may, for example, arise from plastic such polyvinyl chloride in the organic wastes. Generally a substantial amount of water is present in the gas stream and the additional water scrubbing may not be required in all cases.

The gaseous products from the first condenser 7 then passed to a lower temperature condenser 9 which typically operates in the range of from about $-30°$ C. to $0°$ C. This serves to condense out the most valuable products such as formic acid, acetic acid, propionic acid, butyric acid, acetone, formaldehyde, acetaldehyde, furfuraldehyde, methyl ethyl ketone, diethyl ketone, additional phenol, ethyl alcohol, methyl alcohol, propyl alcohol, and usually a substantial amount of water. These mixed liquids are then passed to conventional separators 10 wherein by chemical and mechanical means, fractional distillation and the like, at least some of the valuable organic compounds are isolated. A number of aliphatic hydrocarbons may also be produced and these may be individually separted or used as fuel. The fuel value of the liquids from the condensor 9 may be sufficient that they are used directly or as mixed with petroleum oil for fuel rather than effecting separation of organic compounds in the separators 10. Generally, however, it is preferred to extract and recover at least some of the organic molecules before using the remainder solely for fuel.

The gases remaining after the lower temperature condensation are passed to conventional separators 11 wherein at least a portion of the valuable components may be isolated for further utilization. The gases typically include methane, ethane, ethylene, propane, butane, carbon monoxide, carbon dioxide, nitrogen, and the like and at least portions of these can be recovered economically. The portions that cannot be economically recovered have a sufficiently high fuel value to be used for supplying energy as a conventional gaseous fuel.

Although only a single embodiment of technique for microwave pyrolysis of solid organic waste has been described and illustrated herein, many modifications and variations will be apparent to one skilled in the art. Thus, for example, in order to bias the production of organic compounds towards different products, substantial variations can be made in the composition of gas employed in the gas stream. It is therefore to be understood that within the scope of the appended claims the invention may be practiced otherwise than as specifically described.

What is claimed is:

1. A process for recovering vaporizable organic compounds from solid waste containing organic materials which comprises the following steps:
    passing a gaseous stream through a microwave discharge zone; the pressure of the gaseous stream in said zone being from about 0.1 mm. of mercury to below about atmospheric pressure; the temperature of said zone being between about ambient temperature and less than about 200° C.;
    passing comminuted solid waste containing organic materials through said zone; and
    subjecting the gaseous stream and the comminuted wastes in said zone to microwave discharge to ionize the gases in the stream and form vaporizable high reactive fragments of the organic materials which become entrained in the flowing gaseous stream, wherein interactions occur between the ionized gases and reactive fragments.

2. The process as defined in claim 1, wherein the gaseous stream includes gases selected from the group consisting of oxygen, nitrogen, hydrogen, water vapor, carbon dioxide, carbon monoxide, methane, and mixed gases recycled from the gas stream after the subjecting step.

3. The process as defined in Claim 2 wherein the gas pressure is less than about 100 mm. of mercury.

4. The process as defined in Claim 1 wherein the comminuted wastes are subjected to microwave discharge for an average of about one second.

5. The process as defined in Claim 1 wherein the wastes comprise principally carbohydrates.

6. The process as defined in Claim 1 wherein the gas pressure is less than 100 mm. of mercury.

7. The process as defined in Claim 1 including the additional step of mixing the comminuted solid waste with the gas of the gaseous stream prior to passing the solid waste through the microwave discharge zone.

8. The process as defined in Claim 1 wherein the microwave discharge in said zone is in the low gigahertz frequency range.

9. The process as defined in Claim 1 wherein the microwave discharge in said zone is in the frequency range of about 2.4 gigahertz.

References Cited

UNITED STATES PATENTS

| | | | |
|---|---|---|---|
| 3,449,213 | 6/1969 | Knapp et al. | 201—19 |
| 2,555,450 | 6/1951 | Lee | 34—1 |
| 1,414,401 | 5/1922 | Farup | 201—19 |
| 3,362,887 | 1/1968 | Rodgers | 201—25 |

NORMAN YUDKOFF, Primary Examiner

DAVID EDWARDS, Assistant Examiner

U.S. Cl. X.R.

201—8, 19, 25, 35, 37